(12) United States Patent
Schaefer et al.

(10) Patent No.: US 11,544,948 B2
(45) Date of Patent: Jan. 3, 2023

(54) CONVERTING HANDWRITTEN DIAGRAMS TO ROBOTIC PROCESS AUTOMATION BOTS

(71) Applicant: SAP SE, Walldorf (DE)

(72) Inventors: Bernhard Schaefer, Heidelberg (DE); Andreas Gerber, Koenigsbach (DE)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 17/035,176

(22) Filed: Sep. 28, 2020

(65) Prior Publication Data
US 2022/0097228 A1 Mar. 31, 2022

(51) Int. Cl.
| | |
|---|---|
| *G06V 30/414* | (2022.01) |
| *G06K 9/62* | (2022.01) |
| *G06T 1/00* | (2006.01) |
| *G06V 10/22* | (2022.01) |
| *G06V 30/10* | (2022.01) |
| *G06V 30/422* | (2022.01) |

(52) U.S. Cl.
CPC ......... *G06V 30/414* (2022.01); *G06K 9/6215* (2013.01); *G06T 1/0014* (2013.01); *G06V 10/225* (2022.01); *G06V 30/10* (2022.01); *G06V 30/422* (2022.01); *G06V 2201/06* (2022.01)

(58) Field of Classification Search
CPC .... G06V 30/414; G06V 10/225; G06V 30/10; G06V 30/422; G06V 2201/06; G06V 10/20; G06V 10/82; G06K 9/6215; G06T 1/0014; G06Q 10/0631
See application file for complete search history.

(56) References Cited

U.S. PATENT DOCUMENTS

| | | | |
|---|---|---|---|
| 2004/0090439 A1* | 5/2004 | Dillner | G06V 30/422 717/100 |
| 2007/0168382 A1* | 7/2007 | Tillberg | G06F 16/313 707/E17.084 |
| 2014/0285425 A1 | 9/2014 | Takahashi et al. | |

(Continued)

OTHER PUBLICATIONS

Offline Sketch Parsing via Shapeness Estimation published in 2015 (Year: 2015).*

(Continued)

*Primary Examiner* — Nizar N Sivji
(74) *Attorney, Agent, or Firm* — Buckley, Maschoff & Talwalkar LLC

(57) ABSTRACT

Systems, methods, and computer programmable products are described herein for generating a robotic process automation bot script from a handwritten sketch. A digitally encoded image having a handwritten diagram with objects is received. The handwritten diagram is converted into a digital flowchart having a plurality of nodes. A confidence score is determined for the nodes based on (i) a textual similarity of contents of the node and a plurality of executable bot activities or (ii) a contextual similarity between a set of activities which measures how often they coappear in a plurality of reference bots. A robotic process automation bot script is generated by mapping the plurality of nodes to an executable bot activity of the plurality of executable bot activities based on the confidence score. The robotic process automation bot is then provided to a robotic process automation system for further modeling.

20 Claims, 11 Drawing Sheets

(56) References Cited

U.S. PATENT DOCUMENTS

| | | | |
|---|---|---|---|
| 2017/0109578 A1 | 4/2017 | Bednarowicz et al. | |
| 2019/0324781 A1* | 10/2019 | Ramamurthy | G06N 3/0454 |
| 2021/0034860 A1* | 2/2021 | Bednarowicz | G06F 40/205 |
| 2021/0073530 A1* | 3/2021 | Schaefer | G06V 30/422 |

OTHER PUBLICATIONS

VizDraw: A Platform to Convert Online Hand-Drawn Graphics into Computer Graphics—2009 (Year: 2009).*

An Empirical Investigation of the Effectiveness of Optical Recognition of Hand-Drawn Business Process Elements by Applying Machine Learning—2020 (Year: 2020).*

Recognition of Hand Drawn Flowcharts—2013 (Year: 2013).*

Online flowchart understanding by combining max-margin Markov random field with grammatical analysis 2017 (Year: 2017).*

Online recognition of sketched arrow-connected diagrams—2016 (Year: 2016).*

Awal et al., "First experiments on a new online handwritten flowchart database," *Proc. SPIE 7874, Document Recognition and Retrieval XVIII*, 78740A (2011).

Awal et al., "First Experiments on a new Online Handwritten Flowchart Database," *Proc. of SPIE—The International Society for Optical Engineering*, pp. 1-10 (2011).

Bresler et al., "Modeling flowchart structure recognition as a max-sum problem," *2013 12th International Conference on Document Analysis and Recognition*, pp. 1215-1219 (2013).

Bresler et al., "Online recognition of sketched arrow-connected diagrams," *International Journal of Document Analysis and Recognition*, 19(3):253-267 (2016).

Bresler et al., "Recognizing off-line flowcharts by reconstructing strokes and using on-line recognition techniques," *2016 15th International Conference on Frontiers in Handwriting Recognition (ICFHR)*, pp. 48-53 (2016).

Carton et al., "Fusion of statistical and structural information for flowchart recognition," *2013 12th International Conference on Document Analysis and Recognition*, pp. 1210-1214(2013).

Dijkman et al., "Similarity of business process models: Metrics and evaluation," *Information Systems*, 36:498-516 (2011).

Girshick et al., "Rich feature hierarchies for accurate object detection and semantic segmentation," *2014 IEEE Conference on Computer Vision and Pattern Recognition (CVPR)*, 1:580-587 (2014).

He et al., "Mask R-CNN," *IEEE International Conference on Computer Vision*, pp. 2961-2969 (2017).

Julca-Aguilar et al., "Symbol detection in online handwritten graphics using faster R-CNN," *2018 13th IAPR International Workshop on Document Analysis Systems (DAS)*, 1:151-156 (2018).

Lemaitre et al., "Interest of syntactic knowledge for on-line flowchart recognition," in *Graphics Recognition. New Trends and Challenges 9th International Workshop*, pp. 89-98 (2011).

Lemaitre et al., "Interest of Syntactic Knowledge for on-line Flowchart Recognition," *Proc. of Ninth IAPR International Workshop on Graphics Recognition*, pp. 85-88 (2011).

Lin et al., "Feature pyramid networks for object detection," *Proceedings of the IEEE Conference on Computer Vision and Pattern Recognition*, pp. 2117-2125 (2017).

Marti et al., "The IAM-database: an English sentence database for offline handwriting recognition," *International Journal on Document Analysis and Recognition*, 5(1):39-46 (2002).

Massa et al., "Maskrcnn-benchmark: Fast, modular ref-erence implementation of instance segmentation and object detection algorithms in PyTorch," Retrieved on Aug. 22, 2019. Retrieved online from URL:https://github.com/facebookresearch/maskrcnn-benchmark, 6 pages (2018).

Mishra et al., "VizDraw: a Platform to Convert Online Hand-Drawn Graphics into Computer Graphics," *ICIAR 2009, LNCS 5627*, Kamel et al. eds., Springer-Verlag, Berlin, Germany, pp. 377-386 (2009).

Miyao et al., "On-line handwritten flowchart recognition, beautification, and editing system," *2012 International Conference on Fronteirs in Handwriting Recognition*, pp. 83-88 (2012).

Mouch'Ere, "Online handwritten flowchart dataset (OHFCD)," Jun. 20, 2018, Retrieved on Aug. 22, 2019. Retrieved online from URL:http://tc1 1.cvc.uab.es/datasets/OHFCD_1, 2 pages.

Pacha et al., "Handwritten music object detection: open issues and baseline results," *2018 13th IAPR International Workshop on Document Analysis Systems (DAS)*, 1:163-168 (2018).

Reimers et al., "Sentence-BERT: Sentence Embeddings using Siamese BERT-Networks," arXiv:1908.10084v1, pp. 1-11 (2019).

Ren et al., "Faster R-CNN: Towards real-time object detection with region proposal networks," *Advances in Neural Information Processing Systems 28*, pp. 91-99 (2015).

Szwoch et al., "Recognition of Hand Drawn Flowcharts," *Image Processing & Communications Challenges 4, AISC 184*, Choras et., Springer-Verlag, Berlin, Germany, pp. 65-72 (2013).

Toshev et al., "DeepPose: human pose estimation via deep neural networks," *2014 IEEE Conference on Computer Vision and Pattern Recognition (CVPR)*, 1:1653-1660 (2014).

Van Der Walt et al., "scikit-image: Image processing in Python," *PeerJ*, 2:e453 (2014).

Wang et al., "Combined Segmentation and Recognition of Online Handwritten Diagrams with High Order Markov Random Field," *2016 15th International Conference on Frontiers in Handwriting Recognition (ICFHR)*, 1:252-257 (2016).

Wang et al., "Online flowchart understanding by combining max-margin Markov random field with grammatical analysis," *International Journal on Document Analysis and Recognition (IJDAR)*, 20(2):123-136 (2017).

Wu et al., "Offline sketch parsing via shapeness estimation," *Proceedings of the Twenty-Fourth International Joint Conference on Artificial Intelligence (IJCAI)*, pp. 1200-1206 (2015).

Yuan et al., "A Novel Pen-Based Flowchart Recognition System for Programming Teaching," *Lecture Notes in Computer Science 5328*, Leung et al. eds., Springer-Verlag, Berlin, Germany, pp. 55-64 (2008).

* cited by examiner

CONVERTING HANDWRITTEN DIAGRAMS TO ROBOTIC PROCESS AUTOMATION BOTS

TECHNICAL FIELD

The subject matter described herein relates to enhanced techniques for converting handwritten diagrams into executable software robots.

BACKGROUND

Robotic Process Automation (RPA) is a form of workflow automation technology that enables the automation of tasks that can be performed in graphical user interface (GUI) applications in an operating system, such as opening an invoice document and entering the relevant information into a graphical enterprise resource planning (ERP) application. Workflows to be automated can be discovered during customer workshops, where the steps involved in the workflow are sketched as a flowchart on whiteboards or paper. Commercial RPA software suites can offer a bot design application, where users can design bots with step-by-step execution sequences and dependencies, similar to flowchart modeling. The rectangular process node within the bot flowchart represents an activity that will later be executed by the bot, such as opening or interacting with a graphical ERP application. To lower the cost of creating and maintaining bots, RPA software suites also feature a bot and activity repository, which allows the reusage of activities that have already been implemented in other scenarios. Converting a flowchart sketch to a bot within the bot design application is very time consuming and error prone, since the user has to recreate a digital flowchart-like representation of the sketch. This involves recreating the steps within the workflow, creating step interconnections, and retyping the textual description of the steps. Moreover, the steps have to be verified to determine whether a matching activity already exists within a potentially large repository. Overall, the recreation of a digital bot workflow from a handwritten workflow is a tedious manual process that could be automated. An automation tool would make these workshops more interactive and collaborative, since it allows a smooth transition between haptic modeling tools such as whiteboard and software-based tools such as an RPA bot design application.

SUMMARY

In one aspect, a method implemented is by one or more data processors forming part of at least one computing device. A handwritten flowchart recognition component receives a digitally encoded image comprising a handwritten diagram having a plurality of objects. The handwritten flowchart recognition component converts the handwritten diagram into a digital flowchart having a plurality of nodes. The digital flowchart is in a computer-readable editable format. An activity matching component determines a confidence score based on at least one of (i) a textual similarity of contents of the node and a plurality of executable bot activities or (ii) a contextual similarity between a subset of the plurality of executable bot activities. A flowchart to robotic process automation bot component generates a robotic process automation bot script by mapping the plurality of nodes to an executable bot activity of the plurality of executable bot activities based on the confidence score. The robotic process automation bot script is provided to a robotic process automation system for further modeling.

In some variations, a data repository having the plurality of bots and the plurality of executable activities can be queried. A query can include handwritten labels for the plurality of nodes. A node can be paired with one executable bot activity of the plurality of executable bot activities. The confidence score can be generated the pairs. At least one executable bot activity can be ranked based on the confidence score the bot activity. A highest ranking executable bot activity the node is mapped to that node.

In other variations, providing the robotic process automation bot script can include displaying the robotic process automation bot script on a graphical user interface having a positive indicator representing the confidence score is above a predetermined threshold or a negative indicator representing the confidence score is below a predetermined threshold.

In some variations, the activity matching component can receive feedback corrections from a user correcting mappings having the negative indicator. The activity matching component can be optimized using the feedback corrections to further improve the matching.

In other variations, the textual similarity can be a score between 0 and 1 and can be determined based on the contents of one node of the plurality of nodes compared with contents of one of the executable bot activities.

In some variations, the contextual similarity can be determined by comparing at least two activities within the repository and measuring how often they coappear in the bots within the repository. The at least three nodes can be compared with at least three execution bot activities.

In other variations, the confidence can be determined by a weighted combination of the textual similarity and the contextual similarity.

In some variations, further modeling of the proposed robotic process automation bot script can include at least one of modifying the robotic process automation bot script using a bot design application, storing a finalized robotic process automation bot script within a bot repository of the robotic process automation system, or executing the robotic process automation bot script using a bot execution engine of the robotic process automation system.

In other variations, the object detection component can use a convolutional neural network (CNN) architecture.

In some variations, at least one executable bot activity can include at least one of (i) a name of an automation, (ii) a description of the automation, (iii) implementation code for the automation, (iv) an input parameter, and (v) an output field comprising a result of the automation.

In other variations, converting the handwritten diagram into a digital flowchart includes: localizing and classifying, by the object detection component, a plurality of objects within the handwritten diagram; identifying, by a structure recognition component, connections between symbols of the plurality of objects based on content of the respective object; interpreting, by a handwriting recognition component, one or more alphanumeric text strings within a portion of the plurality of objects; and automatically generating, without human intervention, the digital flowchart of the digitally encoded image, the digital flowchart having the identified connections among the plurality of objects, the digital flowchart being in a computer-readable editable format.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an automation tool that can automatically convert an image of a sketched diagram, such as a handwritten business process sketch on a whiteboard, into a robotic process automation bot. A deep learning model can be integrated into a larger system for end-to-end handwritten diagram recognition. The deep learning system described herein can also be trained to detect any kind of graphical modeling languages that include symbols, textual annotations, and/or arrow interconnections. The training also includes feedback corrections applied to the robotic process automation output. Use of such subject matter can allow for substantial time savings and foster collaborative and creative environments commonly performed on a whiteboard.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
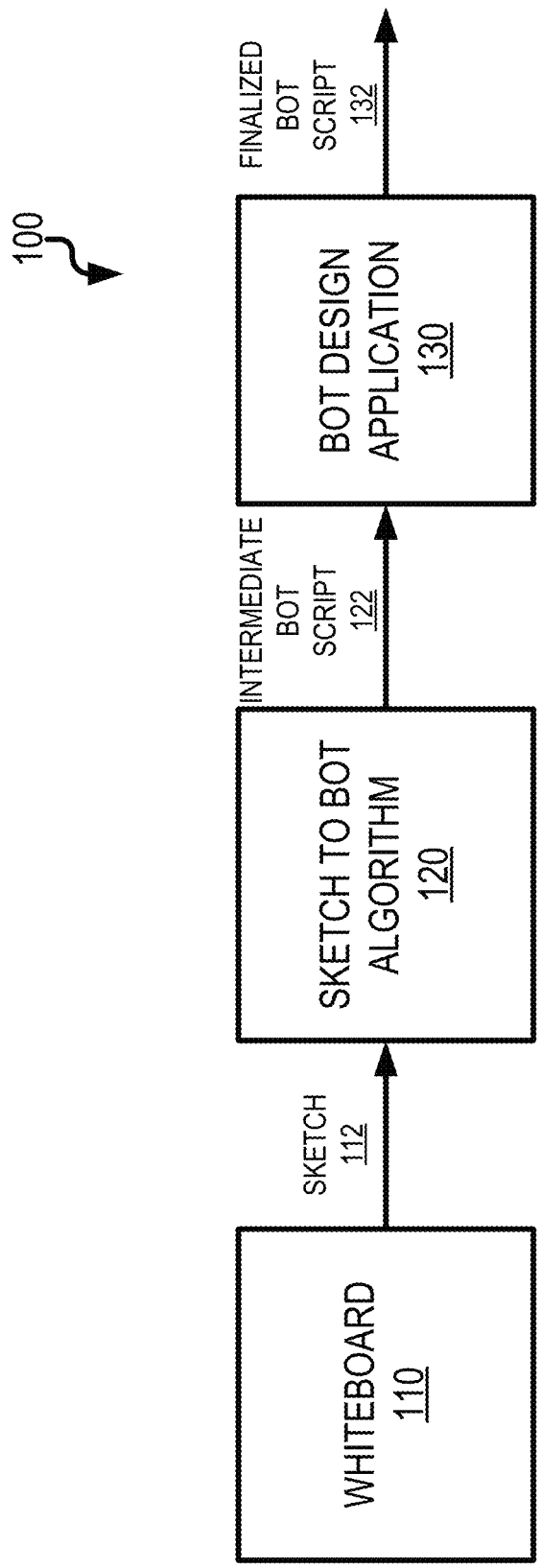
FIG. 1 illustrates a process flow diagram for translating a handwritten image into a robotic process automation bot script including activity confidence scores, further modifying the script in a bot design application, saving the finalized bot script in a bot repository, and finally executing the bot where it runs on a computer without needing input from a user.

An automation workflow is described herein that converts handwritten diagrams such as sketches from a whiteboard into executable software robots in the context of robotic process automation (RPA). During this process, the nodes in the handwritten diagram is mapped to an executable activity with one or more bots that can execute an activity described by the handwritten diagram. A bot includes a succession of automation steps to execute as part of an automated process. The steps are arranged in a flowchart, where the individual nodes represent either activities or control structures such as start/end nodes, conditions or loops. In the simplest case, the flowchart is a sequence which consists of a start node, a sequence of activities, and an end node. Although the use of flowchart notation is described herein as a leading example for how a user might sketch an automation workflow, the processes described herein are not limited to flowcharts. Such processes can also be applied to other diagram notations such as workflow sketches using the Business Process Model and Notation (BPMN) notation.

Flowchart recognition can be divided into two basic approaches: online recognition and offline recognition. With online recognition, flowchart diagrams are drawn on an input device such as a tablet. This input device captures the drawing as a sequence of strokes. With offline recognition, the input is a raster image and is processed after the image is created. Offline recognition can be used, for example, in recognizing flowcharts drawn on whiteboards. For recognizing objects within images, object detectors based on convolutional neural networks (CNNs) can be used. While CNNs can be applied to detect individual symbols of a flowchart, an off-the-shelf object detector cannot be used to detect the relationships between elements within an image. As described herein a deep learning system in combination with structure and handwriting recognition can be used for offline diagram recognition for flowcharts. The system receives an image of a diagram as input (e.g., an image of a handwritten business process diagram drawn on a whiteboard). The system recognizes the symbols, text phrases and arrow connections within the handwritten diagram of the received image and generates a digital flowchart as output.

FIG. 1 illustrates a process flow diagram 100 for translating handwritten images into an RPA bot. Whiteboards, such as whiteboard 110, can be used in a number of different types of activities such as brainstorming, taking notes in meetings, and the like. Handwritten flowcharts such as a sketch 112 written on a whiteboard 110 can identify repetitive manual process suitable for automation. The sketch 112 can include individual steps. The sketch 112 can be recreated digitally in a bot design application 130, which would involve recreating the steps within the workflow, creating step interconnections, and/or retyping the textual description of the steps shown in the sketch 112. An automation process such as a sketch to bot algorithm 120 automates this manual process by converting the sketch 112 into an intermediate bot script 122. During this process, the sketch to bot algorithm 120 matches the individual steps of the sketch to predefined automation steps of a repository of automation steps (e.g., activities). The intermediate bot script 122 is a text-based representation of the automation workflow, and can also be graphically visualized as a flowchart. Unlike a regular bot script, the activity in the intermediate bot script 122 contains a confidence score from the matching process. The automatically created intermediate bot script 122 can be further adjusted in a bot design application 130. Using the bot design application 130, the user can adjust the execution flow by changing the flowchart layout, and the user can change individual activities. Finally, the bot design application 130 can save the finalized bot script. When this bot is executed on a computer such as a desktop computer, it can perform various tasks without needing input from a user. As an example, the finalized software bot 132 could perform a number of tasks such as checking incoming emails for purchase orders, extracting the relevant information from the purchase orders, and entering the data into a graphical user interface of an enterprise resource planning system.

Figure 2:
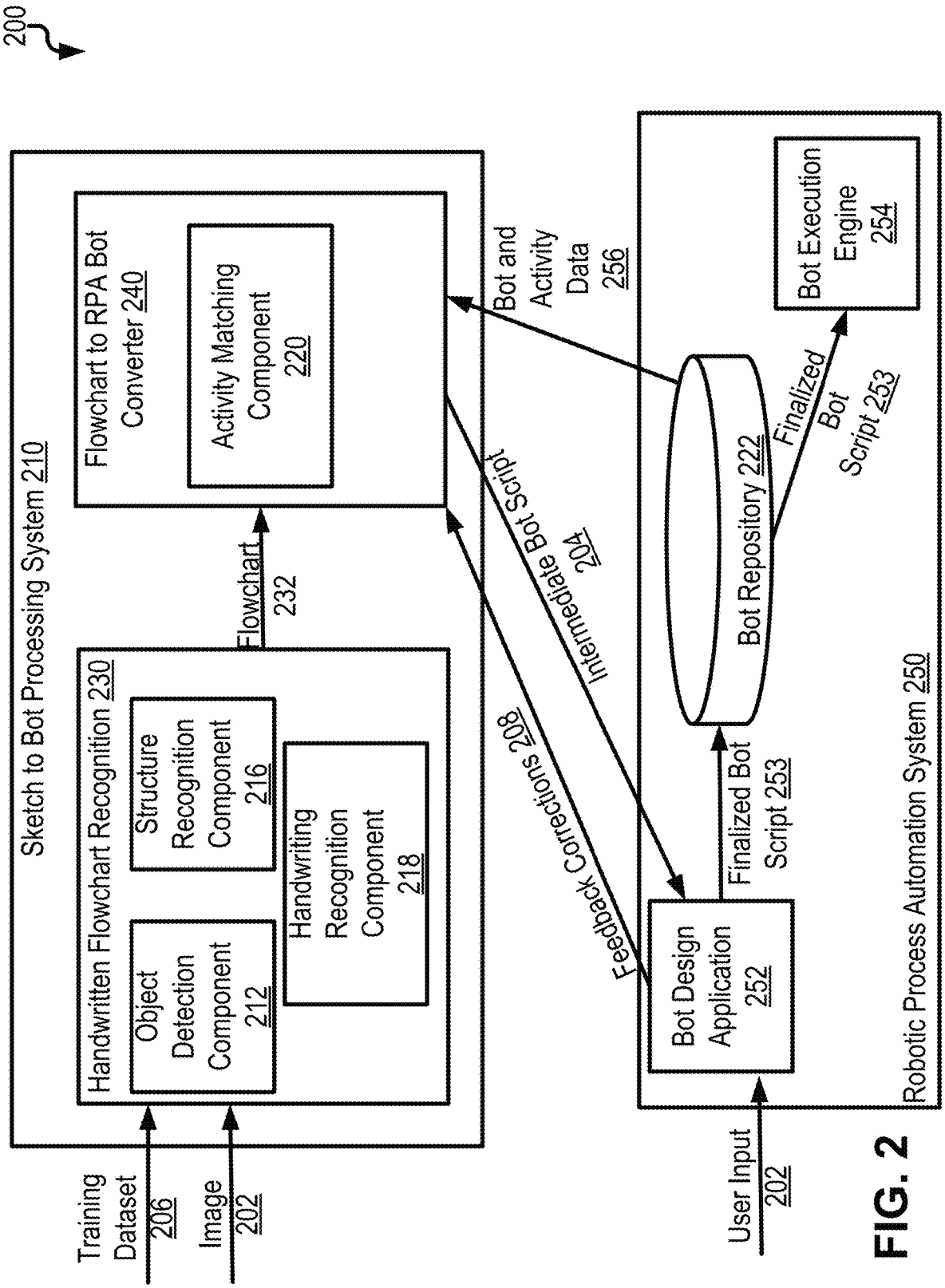
FIG. 2 illustrates an example system that processes an input image and generates a RPA bot script including activity confidence scores.

FIG. 2 illustrates an example system 200 that processes an input (e.g., digitally encoded image 202) such as an image of sketch 112 and generates an RPA bot script 204 of that input digitally encoded image 202. Digitally encoded image 202 can include any computer-readable raster image extension format such as joint photographic experts group (.jpeg or .jpg), portable network graphics (.png), graphics interchange format (.gif), tagged image file (tiff), and/or a bitmap (.bmp). The system 200 includes one or more sketch to bot processing systems 210. Sketch to bot processing system 210 includes handwritten flow chart recognition components 230 such as object detection component(s) 212, structure recognition component 216, and handwriting recognition component 218. Handwritten flowchart recognition components 230 receive training dataset 206 (e.g., various flowcharts with symbol, textual, and arrow annotations). The training dataset 206 and digitally encoded image 202 may be received by the sketch to bot processing system 210 via a communications network, e.g., an Internet, an intranet, an extranet, a local area network ("LAN"), a wide area network ("WAN"), a metropolitan area network ("MAN"), a virtual local area network ("VLAN"), and/or any other network. The training dataset 206 and digitally encoded image 202 may also be received via a wireless, a wired, and/or any other type of connection. Once trained, the object detection component(s) 212 can detect geometric shapes (e.g., rectangles, diamonds), text phrases, and arrows within digitally encoded image 202. The object detection component(s) 212 can include a neural network system described in more detail in FIG. 4. Structure recognition component 216 can determine connections between geometric shapes or symbols within digitally encoded image 202, as described in more detail in FIG. 5. Handwriting recognition component 218 to convert detected handwritten text phrases within digitally encoded image 202, as described in more detail in FIGS. 5-6.

The handwritten flowchart recognition components 230 can collectively work together to generate a digital flow chart 232 of the digitally encoded image 202. The flowchart 232 can be provided to flowchart to RPA bot converter components 240 (e.g., activity matching component 220) for the generation of a RPA bot script 204.

Figure 7:
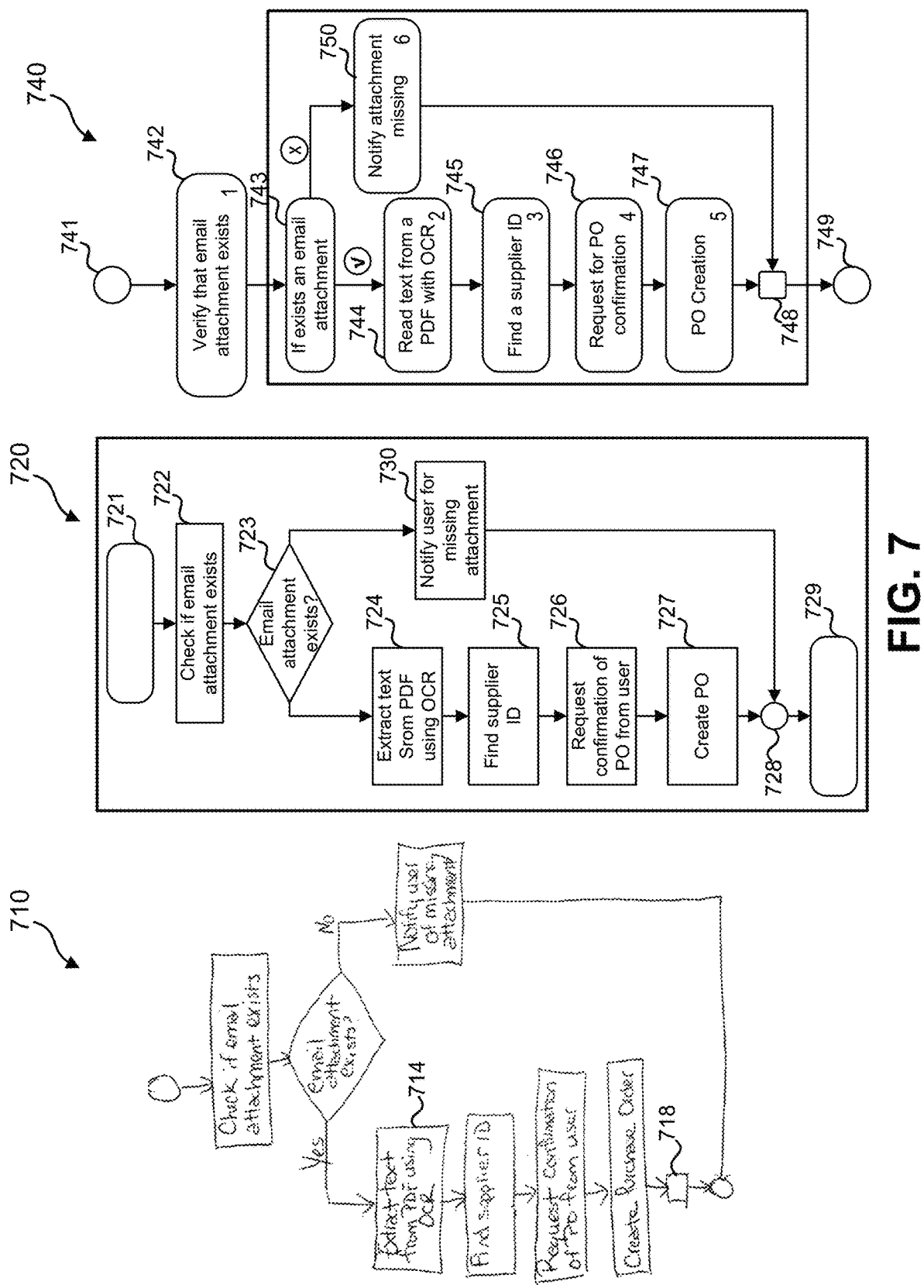
FIG. 7 illustrates stages of the conversion of a workflow sketch image to an executable robotic process automation bot using a sketch to bot algorithm.
Figure 8:
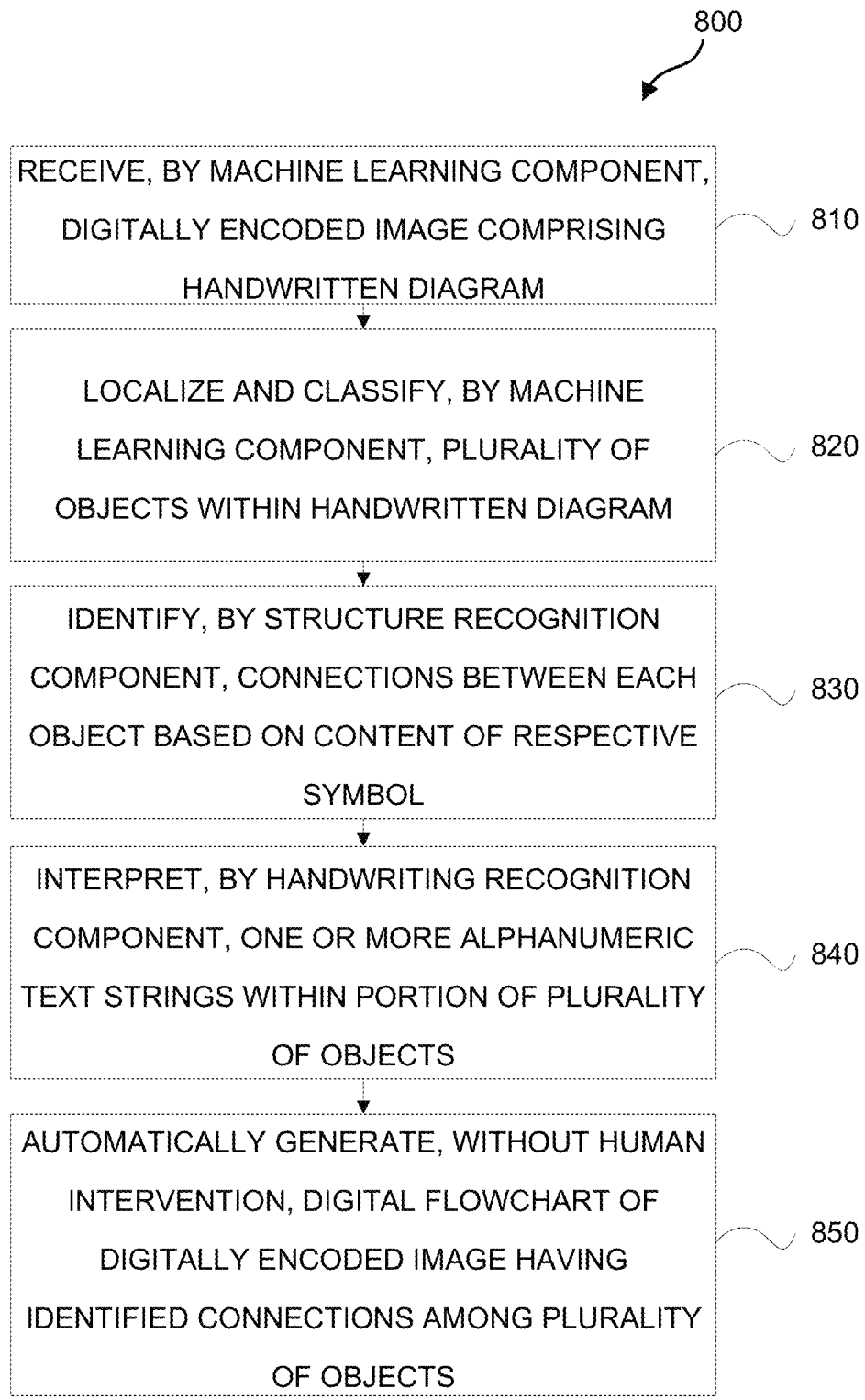
FIG. 8 depicts an example flowchart for generating a digital flowchart based on an input image.

An activity matching component 220 can a sketch to bot algorithm 120 to generate an intermediate bot script 122 as described in more detail in FIGS. 7-8. The activity matching component 220 generates an RPA bot script 204 including a confidence score for the activities. During the activity matching process, multiple potential activities can be found for one flowchart node. To steer the user to potential matching errors, activities with a low confidence can be highlighted when further editing the bot script in the bot design application 252. In order to improve the activity matching component 220, changes that user performs during the editing can be provided back as feedback corrections 208 to improve future executable RPA bot scripts 204. As mentioned, the feedback corrections 208 can be based on user input to the bot design application 252. The activity matching component can learn from these feedback corrections 208 by keeping track of recognized flowcharts and the finalized corrected RPA bot scripts that the users save. To this end, the feedback corrections 208 can be used to automatically optimize the hyperparameters of the activity matching algorithm 120 performed by activity matching component 220. Such optimization includes parameters in the activity matching component, including the high-level weights of the textual and contextual similarity scores and the free parameters of the algorithms used (e.g., BM25 parameters k1 and b).

Sketch to bot processing system 210 and/or RPA system 250 may be implemented using software, hardware and/or any combination of both. Sketch to bot processing system 210 and/or RPA system 250 may also be implemented in a personal computer, a laptop, a server, a mobile telephone, a smartphone, a tablet, and/or any other type of device and/or any combination of devices. The component(s) within the sketch to flowchart module may perform execution, compilation, and/or any other functions on the received training dataset 206 as well as objection detection functions, as discussed in further detail below.

RPA system 250 can also include a data storage component (e.g., bot repository 222) that can store data such as training dataset 206, image 202, bot and activity data 256, and/or feedback corrections 208. The bot repository 222 can be the central location for storing and managing bots and activities. Contents of the bot repository 222 can be leveraged when generating an RPA bot script 204 as described in further detail in FIG. 7. The data storage component 214 may be used for storage of data processed by sketch to bot processing system 210 and may include any type of memory (e.g., a temporary memory, a permanent memory, and/or the like).

The sketch to bot processing system 210 interacts with an RPA system 250 in multiple ways. RPA bot scripts 204 generated by sketch to bot processing system 210 can be provided to RPA system 250. The RPA bot scripts 204 can be further modified with bot design application 252, as previously discussed. The finalized RPA bot script 204 can be stored in bot repository 222. A user can interface with the bot design application 252 using, for example, a graphical user interface to modify the generated bot script. Such modifications can include re-matching bots to particular activities or adding/removing bots from the RPA bot script 204. Those user modifications can be provided back to the sketch to bot processing system 210 (e.g., flow chart to RPA bot converter components 240) as feedback corrections 208 so as to further optimize future generated bot scripts. For example, if a user changes a bot matching, activity matching component 220 can take this information into consideration when matching those same components in the future. Bot design application 252 can store the finalized RPA bot script 253 in bot repository 222. Finalized bot script 253 can be read and executed by bot execution engine 254. Executable software bot 253 is a desktop automation software that when executed runs on a computer such as desktop computer to execute a task autonomously. For example, it can use automated mouse clicks and keyboard typing to open other applications such as an enterprise resource planning (ERP) client, navigate these applications, enter relevant information, and the like.

Although FIG. 2 illustrates object detection component 212, data storage component 214, structure recognition component 216, handwriting recognition component 218, and activity matching component 220 within a single sketch to bot processing system 210, it is recognized that one or more of these components can be spread across additional processing systems.

Figure 3:
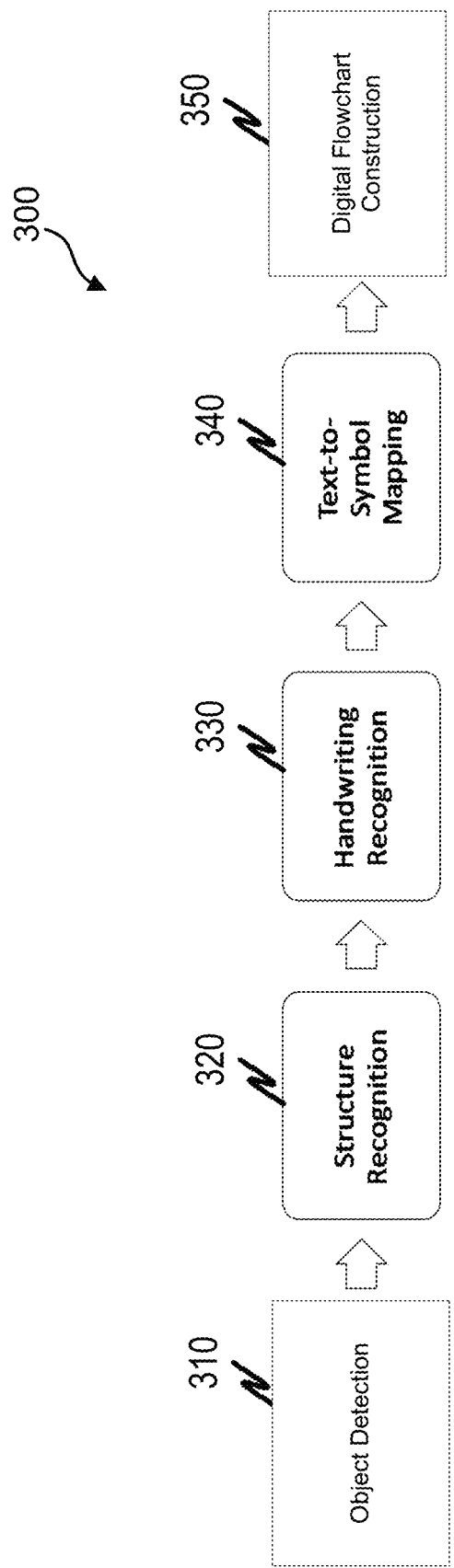
FIG. 3 depicts a handwritten diagram recognition process that is performed on an input image and generates a digital diagram representation.

FIG. 3 depicts the handwritten flowchart recognition process 230 that is performed on an input digitally encoded image 202. Object detection 310 can be performed on the image to identify symbols, text phrases, and/or arrows within input image 202. Structure recognition 320 can use object detection 310 to determine arrow connections between the identified symbols within input digitally encoded image 202. Handwriting recognition 330 uses the detected blocks of text within input digitally encoded image 202 and further recognizes the text within those blocks. Text-to-symbol mapping 340 can assign any identified blocks of texts to a corresponding symbol (e.g., wording within a decision block of the flowchart). With the information gathered through object detection 310, structure recognition 320, handwriting recognition 330, and text-to-symbol mapping 340, a digital flowchart 232 can be constructed through digital flowchart construction 350.

Recognizing the symbols and text phrases of a flowchart can be framed as an object detection task. To this end, a deep learning object detection system can be trained to recognize a set of predefined classes. The set of classes can be defined as arrows, text phrases, and the different node shapes. In the case of flowcharts, the node shapes classes could be, for example terminator (stadium shape), process (rectangle), decision (diamond), input/output (rhomboid), connector (small circle). The detected objects within digitally encoded image 202 are specified through a predicted class (e.g., decision) and an object bounding box. The object bounding box can be represented as a rectangular box that specified through the x and y axis coordinates of its upper-left corner and the x and y axis coordinates of its lower-right corner. To train such as deep learning system, a training dataset of annotated images can be used, where the location and class of relevant objects in the image are specified. After the training process, the deep learning model can be used to recognize symbols within digitally encoded images 202.

The object detection system for flowchart symbol and text phrase recognition can use a region-based convolutional neural network (R-CNN) as its deep learning object detection system. In other words, the object detection component(s) 212 can include R-CNN capabilities. The R-CNN method uses a two-stage approach to detect objects in an image. The first stage (e.g., Stage 1) generates a set of region of interests (RoI), where the RoI is defined by a bounding box location and an objectness score. The second stage (e.g., Stage II) then classifies the RoI and predicts a refined bounding box location. The symbol and text phrase recognition component can also be trained using a one-stage deep learning object detection system which requires one pass through the neural network to predict objects and their bounding boxes.

Augmentation can be used to train the object detection component(s). For example, during a training session, training data set 206 can include image transformations. Random image transformations can be made to images within training dataset 206 such as random degree rotation (e.g., 0°, 90°, 180°, 270°), flipping of images (e.g., horizontal and/or vertical rotation), and/or random resizing of images (e.g., resizing images to scales of [640,800] pixels, having a step size of 32. In another example training session, training dataset 106 can include word augmentation. Such training can avoid false detection occurrences of a symbol within a text phrase (e.g., a handwritten "1" in the word "false" being detected as an arrow symbol).

The structure recognition component 320 can determine the relationships between the recognized symbols within input digitally encoded image 202. To this end, it can use the recognized node shapes, text phrases, and arrows from object detection 310 to determine the flowchart structure. For the arrows, the arrow structure recognition algorithm determines the incoming and outgoing node shape, i.e., the node shape that the arrow points to and the node shape that the arrow originates from. Also, the text-to-symbol mapping algorithm can assign any identified blocks of texts to a corresponding symbol (e.g., wording within a decision block of the flowchart, or wording that labels and arrow). As a simple heuristic, block of texts within a node shape can be mapped to the enclosing node shape, and text blocks outside of node shapes can be assigned to an arrow in close proximity.

Figure 4:
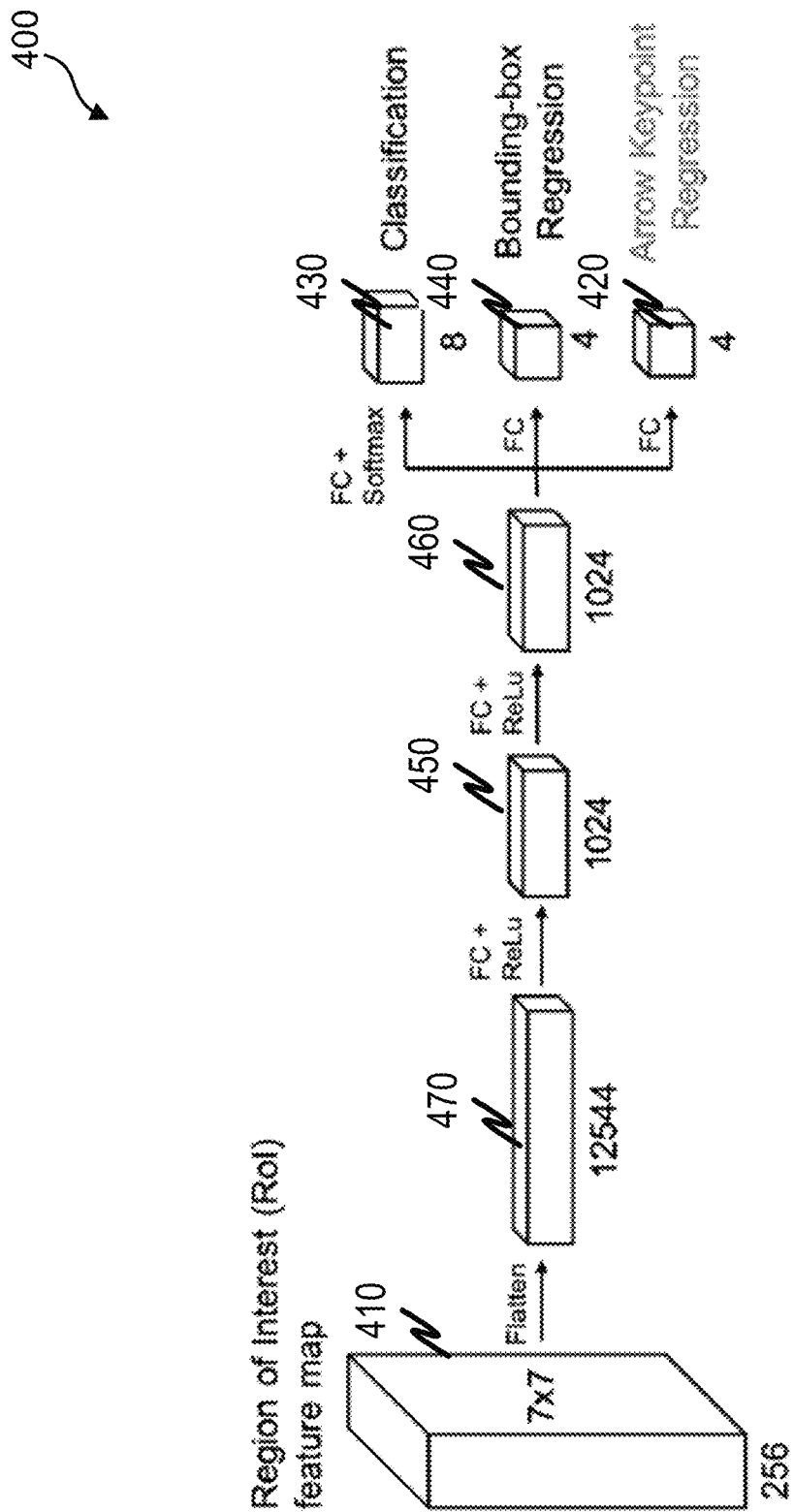
FIG. 4 depicts an example head network for use in symbol and keypoint recognition.

For arrow structure recognition, the object detection method can be extended with a component for recognizing arrow keypoints. FIG. 4 illustrates a neural head network that is responsible for the second stage in a two-stage object detector, i.e., classifying the objects and predicting a refined bounding box location. The head network 400 processes the RoI features within RoI feature map 410 through fully connected (FC) layers with rectified linear unit activation functions (ReLu) 450, 460. The head network 400 then predicts a class and a refined bounding box from a 1024-diminensional feature vector (e.g., classification 430, and bounding-box regression 440). For predicting arrow keypoints, the head network 400 can be extended with an arrow keypoint regression component 420, which predicts arrow head and arrow tail coordinates for the arrows. For the predicted arrows, the node symbols it connects to can be specified as the symbols closest to the arrow keypoints. The closeness between a keypoint and a symbol can be defined as the distance between the keypoint and the symbol bounding box. Since the bounding boxes are axis-aligned this distance can be computed as the minimum distance to sides of the rectangle. Co-pending application Ser. No. 16/567,928, filed Sep. 11, 2019, entitled "Handwritten Diagram Recognition Using Deep Learning Models," the contents of which are incorporated herein in its entirety, further describe a two-stage object detection system with an arrow keypoint predictor.

Figure 5:
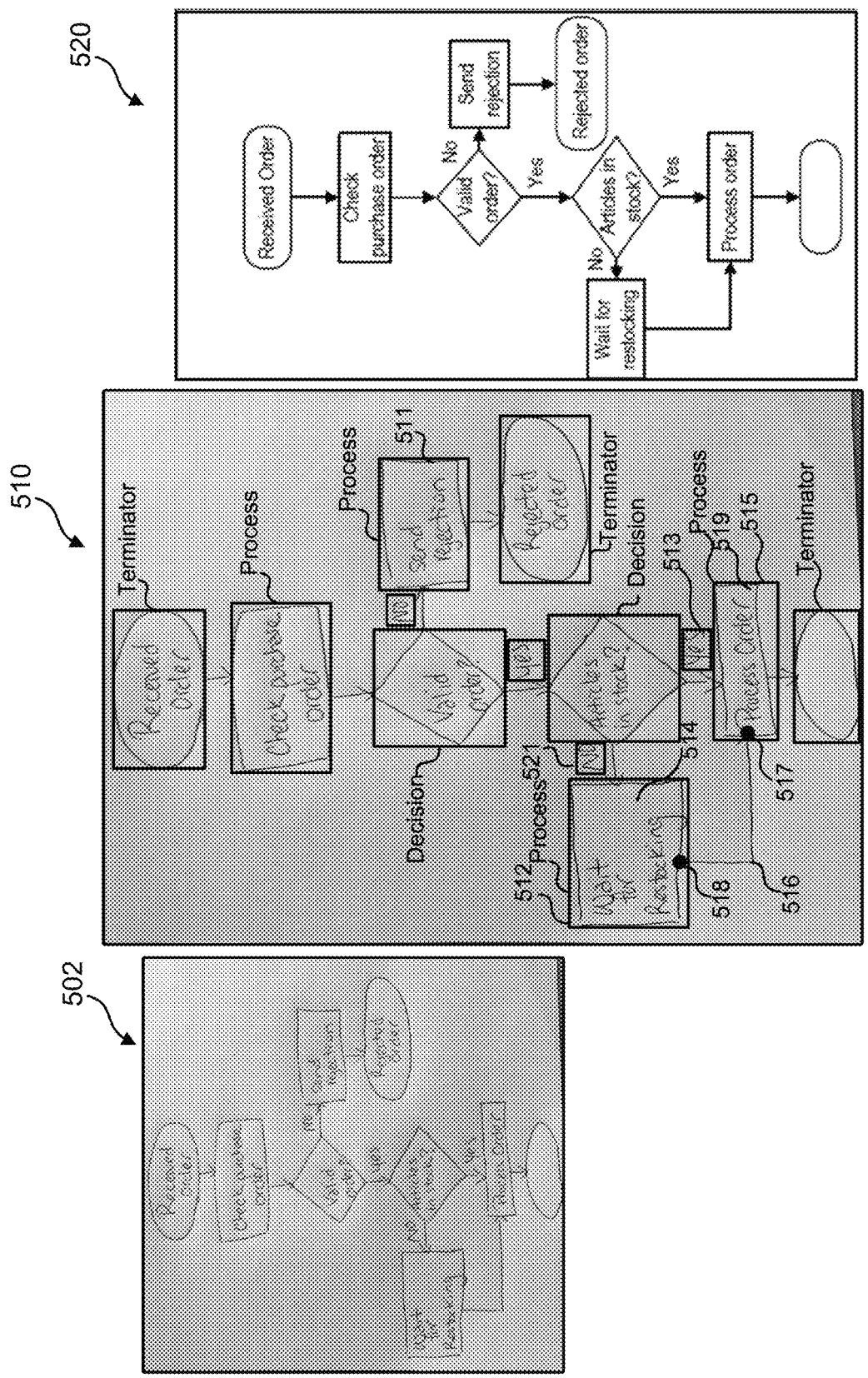
FIG. 5 depicts an example image of a flowchart captured from a whiteboard, including intermediate and final recognition results.

FIG. 5 depicts an example image 502 of flowchart captured from a whiteboard, including intermediate and final recognition results. Image 502 is received as input by object detection component(s) 212. Object detection component(s) 212 performs object detection 310 and outputs an annotated image 510 having a set of detected objects, where the object is described through a class (e.g., terminator class, process class, arrow class, text block class, and/or decision class) and a bounding box. In addition, for arrows the object detection component(s) 212 can predict keypoint information that specifies the spatial locations of the arrow head and arrow tail. The symbols are localized through a bounding box (e.g., 512, 514, 516) and classified into a symbol class (e.g., terminator block, process block, arrow block, text block, and/or decision block). Additionally, for bounding boxes that are classified as arrows (e.g., arrow 516), object detection component(s) 212 could predict an arrow head 517 and an arrow tail 518. Once objects and bounding boxes are identified within input image 502, input image 502 can be cropped along the sides up to the beginning of the outermost bounding box.

For recognizing structure within the image 502, structure recognition 320 can determine connections between the symbols (e.g., between bounded box 512 and bounded box 515). For example, the symbols which connect to predicted arrow 516 are identified with structure recognition 300. The symbols connected to predicted arrow 516 are those symbols closest to each arrow keypoint (e.g., arrow head 517 and arrow tail 518). The closeness between a keypoint and a symbol can be the distance between the keypoint and the symbol bounding box. The bounding boxes are axis-aligned. As such, the distance measured for closeness can be the minimum distance to the sides of the bounding box. Continuing with arrow 516 as an example, the two bounding boxes closest to the arrow keypoints include bounding box 512 and bounding box 515. As such, both bounding box 512 and bounding box 515 can be identified as connected to arrow 516 during structure recognition 320.

Figure 6:
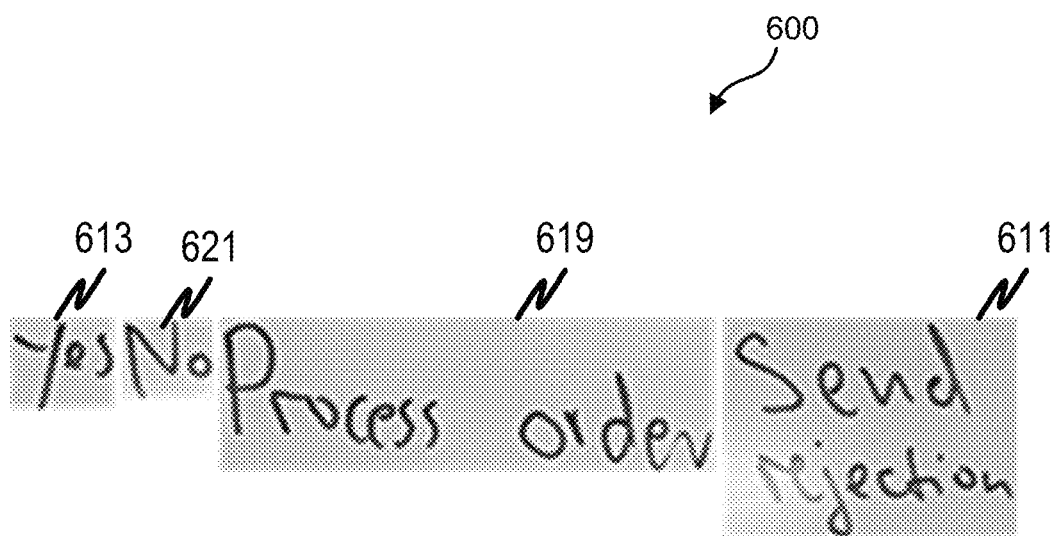
FIG. 6 depicts example detected text phrases cropped out of an example image.

Handwriting recognition 330 can be performed on image 502 to recognize the phrases within identified text blocks from output from object detection 310. As previously described the text blocks within image 502 can be identified using object detection component(s) 212 via object detection 310 (e.g., text 611, 613, 619, 621). The detected text blocks 600 can be cropped out of image 502 as illustrated in FIG. 6. Any appropriate handwriting recognition system can be used to determine the phrases within the detected text block.

Before constructing the digital flowchart 520, text phrases can be assigned to its corresponding symbol using digital flowchart construction 350. For the text phrases identified, checks are performed to see if its bounding box is contained within a symbol bounding box to at least approximately 80%. For example, within annotated image 510, the symbol is localized through a bounding box and classified into one of the symbol classes. Bounding box 514 (e.g., "Wait for restocking") is fully contained (e.g., 100%) within process bounding box 512. As a result, the text annotation "Wait for restocking" is assigned to process bounding box 514.

For generating the digital flowchart 520, the symbols are recreated based on corresponding bounding box spatial positions, symbol class, and optional textual annotation. The detected arrows are then created with the identified connecting symbols. Text phrases that have not been mapped to symbols, which are commonly used to annotate arrows, are placed at its original position. The generation of digital flowchart 520 can be fully automated such that no manual intervention is required.

FIG. 7 illustrates stages of the conversion of a workflow sketch image 710 to a RPA bot script 740 using a sketch to bot algorithm. An image of a workflow sketch (e.g., workflow sketch image 710) such as sketch 112 can be taken automatically by a processing system or through a sequence of strokes as input to an interactive user interface such as a touchscreen tablet. Alternatively, an image of a workflow sketch can be imported from an offline recognition capture (e.g., photographic image of a whiteboard). The sketch to bot algorithm includes converting the workflow sketch image 710 into a digital flowchart 720 as described in detail in FIGS. 3-6. Errors can occur in converting the workflow sketch image 710 to a digital flowchart 720. For example, recognition errors, such as the error introduced by translating object 714 (e.g., "Extract text from PDF using OCR") to node 724 (e.g., "Extract text Srom PDF using OCR").

Objects can be recognized into predefined flowchart classes, even though their shape might not be the same. For example, in the workflow sketch image 710, a rectangle object 718 is used to denote a connection between two arrows. This rectangle 718 is correctly recognized as flowchart connector when generating the digital flowchart 720, which uses a corresponding node 728 of a circular shape rather than a rectangular shape, but has the same semantics (e.g., achieves same functionality of joining two arrows).

The digital flowchart 720 is made up of a series of nodes 721, 722, 723, 724, 725, 726, 727, 728, 729, 730 that representing actions. These nodes can be interconnected to one another (e.g., node 721 can represent initiation a process and after initiation node 722 can represent a check as to if an email attachment exists). The digital flowchart 720 can then be converted into a RPA bot script 740. The nodes 721, 722, 723, 724, 725, 726, 727, 728, 729, 730 within the digital flowchart 720 are mapped against an activity within the repository. This mapping can be done using a bot activity matching feature. Such a feature can be functionality integrated within activity matching component 220. The bot activity matching can take into account various similarity features from the nodes and bot repository, such as syntactic, semantic and contextual similarities. The activity matching component 220 can then generate a RPA bot script 740 using a matching confidence to determine whether to request user feedback. The intelligent RPA bot 720 can include a number of executable bot activities 741, 742, 743, 744, 745, 746, 747, 748, 749, 750. An activity is an automation step that can be reused for bot development. An activity can include (i) a name of the automation, (ii) a description of the automation step, (iii) an implementation which is actual code that is run during the automation, (iv) one or more input fields which include required input parameters such as the file path of an excel spreadsheet, and/or (v) one or more output fields that contain the result of the executed activity such as the content of an excel cell within an excel spreadsheet.

To generate the RPA bot script 740, the nodes in the digital flowchart 720 can be matched to corresponding activities stored in a bot repository (e.g., data storage component 214). For example, node 721 can be matched to activity 741 that initiates the RPA bot 740. Node 722 can be mapped to an executable bot activity that verifies that attachment exists (e.g., bot activity 742). Node 743 which represents a decision node to determine whether an email attachment exists can be mapped to an executable bot activity that determines "if exists an email attachment" (e.g., activity 743). Node 724 that represents extracting text from a portable document format (PDF) using optical character recognition (OCR) can be mapped with an executable bot activity that reads texts from a PDF with OCR (e.g., activity 744). Node 725 that represents finding a supplier identification (ID) can be mapped to an executable bot activity that finds a supplier ID (e.g., activity 745). Node 726 that represents requesting confirmation of a purchase order (PO) from a user can be mapped to an executable bot activity that requests for PO confirmation (e.g., activity 746). Node 727 that represents creating a PO can be mapped to an executable bot activity for PO creation (e.g., activity 747). Nodes 728, 729 can similarly be mapped to corresponding nodes 748, 749, respectively. Node 730 that represents notifying a user for a missing attachment can be mapped to an executable bot activity that notifies an attachment is missing (e.g., activity 750).

Flowchart node 722 is mapped to activity 742. Flowchart node 722 includes the label "check if email attachment exists" and bot 742 states "verify that email attachment exists." Although the textual descriptions between the activity in flowchart node 722 and bot 742 is not identical, the mapping is correct. Textual descriptions used while sketching can differ from the activity description. However, the sketch to bot algorithm utilizes an activity matching algorithm that can leverage both textual similarity and contextual similarity to overcome these differences.

The sketch to bot algorithm utilizes textual similarity. With textual similarity, the recognized handwritten label of the flowchart node 722 can be compared with the names and descriptions of activities stored in the bot repository 222. From an information retrieval perspective, the handwritten label is used as a query and the names and descriptions of activities in the bot repository 222 represent the corpus of documents. A ranking between query and documents can be computed using different ranking functions. For example, this can be similarity measures based on syntactic similarity, such as a ranking function used by search engines to estimate relevance of documents to a given search query (e.g., BM25), or semantic similarity measures based on word or sentence embeddings (e.g., sentence-BERT). Using textual similarity can produce an activity ranking for the flowchart nodes, where the flowchart node and bot activity pairs are scored with a textual similarity between 0 and 1. Turning back to FIG. 9, the query for flowchart node 722 is "Check if email attachment exists" and the highest ranked activity has the name "Verify that email attachment exists" (e.g., score closest to 1). Lower ranked activities may contain other related activities having lower scores, such as "Download email attachment." These lower ranking activities may indicate that mapping that activity with a specific bot is not an optimal match.

The bot repository 222 can contain a large number of bots. The bots can contain implicit knowledge about how to meaningfully orchestrate activities into an automation flowchart. For example, the activity "Verify that email attachment exists" of bot 742 can occur in many different bots. Within those bots, the activity might frequently occur after a start node (e.g., node 741) and before a decision node (e.g., node 743). The contextual similarity evaluation leverages this knowledge by considering the context in which activities appear throughout the bot repository 222. This is in contrast to the textual similarity component, which produces an activity ranking for the nodes independently. In other words, the contextual similarity considers the activity being evaluated as well as the candidate activities surrounding the activity being evaluated (e.g., nodes in the neighborhood of the bot graph).

An RPA bot 740 of FIG. 7 contains a start node 741 and an end node 749. Consider the activity of node 742 that follows the start node 741. For a candidate activity in bot repository 222 with sufficient textual similarity, a probability that this activity follows a start node is computed. The number of times a candidate activity follows a start node within the bot repository 222 is counted (e.g., following frequency). The number of times the candidate activity is used within the bot repository 222 is also counted (e.g., use frequency). With these two values, an approximated probability can be calculated by dividing the following frequency by the use frequency. For example, the activity "Verify that email attachment exists" of node 742 might follow a start node with a 90% probability, whereas "Download email attachment" follows a start node with 0% probability, as the download activity requires a previous activity that identifies the email in question rather than following a start node.

The computed values for the contextual and the textual similarity can be combined into a final score such as a weighted combination, where the weight for the scores can be optimized through feedback corrections 208. Using the final score, a candidate activity with the highest score can be selected. Once a final score is calculated for a particular node such as node 742, contextual scores for the next node in the chart (such as node 744) can be determined. This process continues until the flowchart nodes are mapped with corresponding activities.

More complex contextual similarity methods can also be utilized in the sketch to bot algorithm such as increasing the context window to include the predecessor and successor node activity candidates. In this case, the mapping procedure can be modeled as an optimization problem over the entire flowchart, which uses the textual similarities and the contextual similarity over activity candidate triple to find the set of mapped activities with the highest joint probability.

The bot activity matcher can learn from implicit user feedback (e.g., feedback corrections 208). Based on the final score, the RPA bot script 740 can also provide indications that certain matches may require user feedback on accuracy by, for example, highlighting the matched activities having a confidence score below a particular threshold so as to obtain attention of a user. Such indication can be confirmed by a user or corrected if the user identifies that the mapping is inaccurate (e.g., via feedback corrections 208).

FIG. 8 depicts an example flowchart 800 for generating a digital flowchart based on an input digitally encoded image 202. An object detection component receives, at 810, a digitally encoded image comprising a handwritten diagram. A plurality of objects are localized and classified, at 820, by the object detection component within the handwritten diagram. A structure recognition component identifies, at 830, connections between the individual object of the plurality of objects based on content of the respective object. One or more alphanumeric text strings within the handwritten diagram are interpreted, at 840, by a handwriting recognition component. A digital flowchart of the digitally encoded image is automatically generated, at 850, without human intervention. The digital flowchart has the identified connections among the plurality of objects, the digital flowchart being in a computer-readable editable format.

Figure 9:
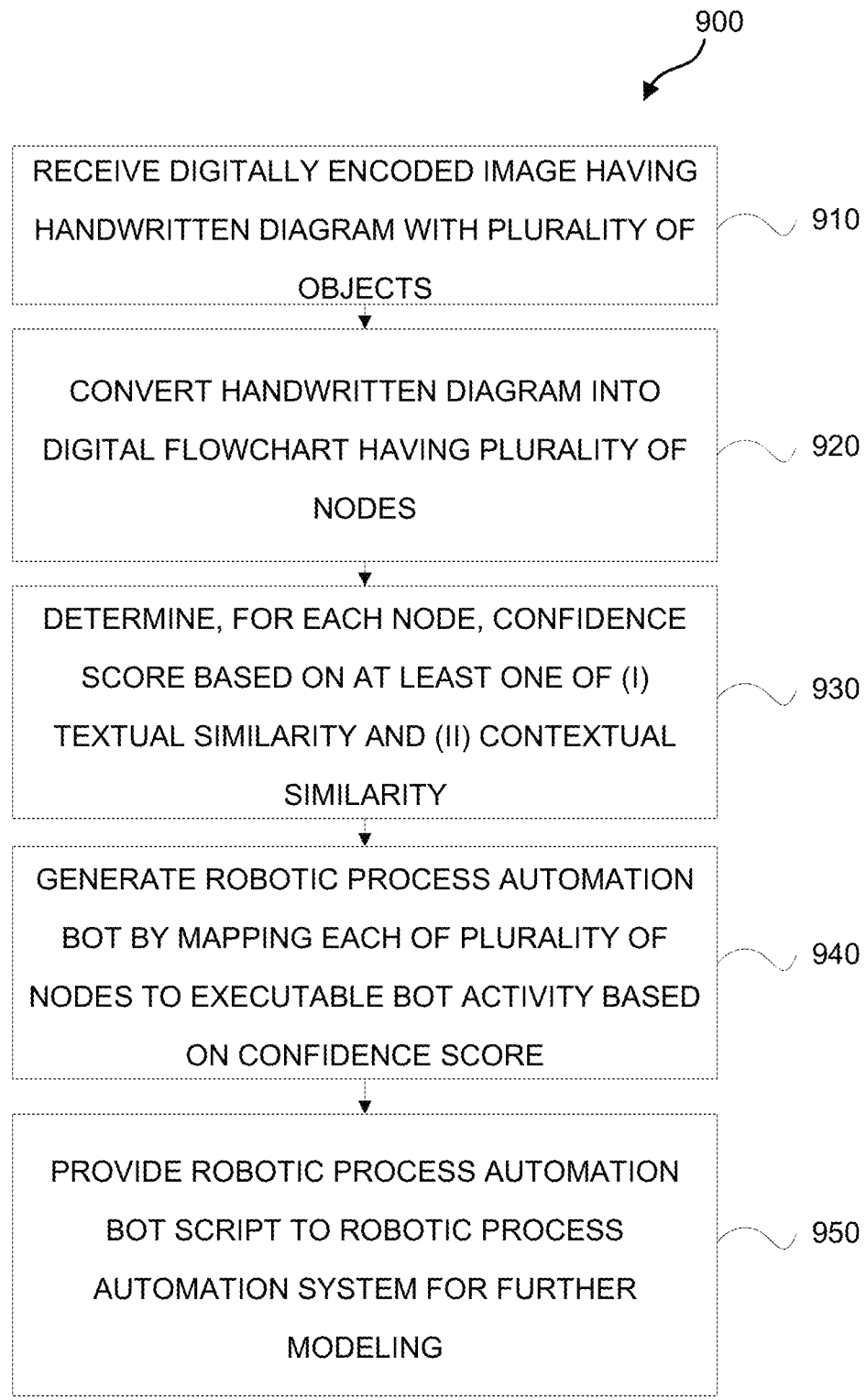
FIG. 9 depicts an example flowchart for generating a robotic process automation bot.

FIG. 9 depicts an example flowchart for generating an RPA bot script. An object detection component 212 receives, at 910, a digitally encoded image 202 a handwritten diagram (e.g., sketch 112) having a plurality of objects (e.g., objects 714, 718. The handwritten flowchart recognition 230 converts, at 920, the handwritten diagram (e.g., sketch 112) into a digital flowchart 720 having a plurality of nodes (e.g., nodes 721, 722, 723, 724, 725, 726, 727, 728, 729, 730). The digital flowchart 720 is in a computer-readable editable format. The activity matching component 220 determines, at 930, a confidence score based on at least one of (i) a textual similarity of contents of the node and a plurality of executable bot activities or (ii) a contextual similarity between the contents of the node, the contents of neighboring nodes to the node, and the plurality of executable bot activities. The flowchart to RPA bot converter 240 generates, at 940, an RPA bot by mapping the plurality of nodes to an executable bot activity of the plurality of executable bot activities based on the confidence score. The RPA bot script 740 can be stored and eventually executed on a computer, where it can be run without needing input from a user. For example, the RPA bot script 740 can be provided, at 950, to a RPA system 250 for further modification by a bot design application 252, storage within a bot repository 222, and/or execution by a bot execution engine 254 as previously described in FIG. 2.

Figure 10:
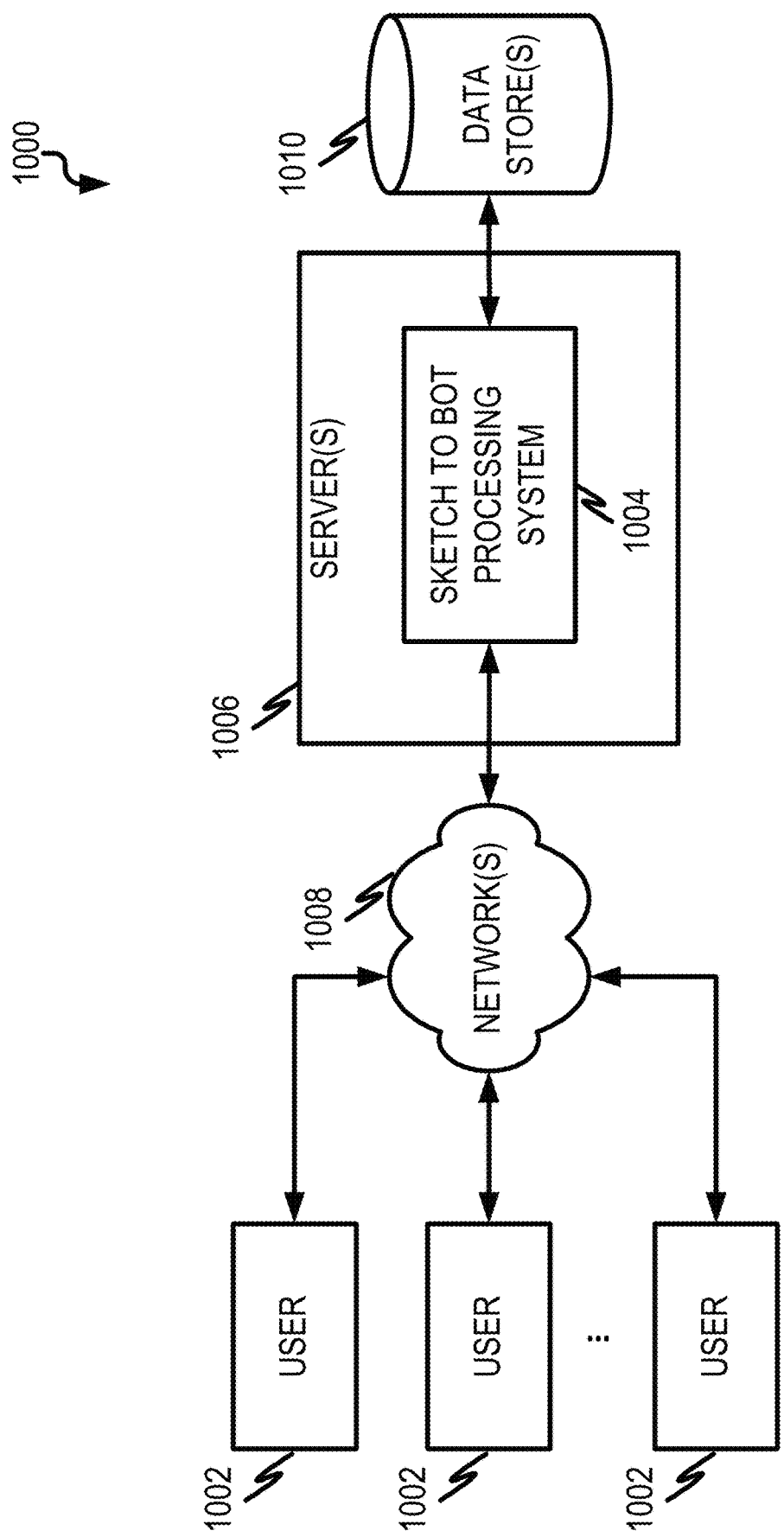
FIG. 10 illustrates an example computer-implemented environment for implementing various aspects described herein.

FIG. 10 illustrates an example computer-implemented environment 1000 wherein users 1002 can interact with sketch to bot processing system 1004 for processing handwritten images as described herein, hosted on one or more servers 1006 through a network 1008. The sketch to bot processing system 1004 can assist the users 1002 with interfacing between an object-oriented modeling language based interface and a hardware description language based interface.

As shown in FIG. 10, the users 1002 can interact with the sketch to bot processing system 1004 through a number of ways, such as over one or more networks 1008. One or more servers 1006 accessible through the network(s) 1008 can host the sketch to bot processing system 1004. The one or more servers 1006 can also contain or have access to one or more data stores 1010 for storing data for the sketch to bot processing system 1004.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 11:
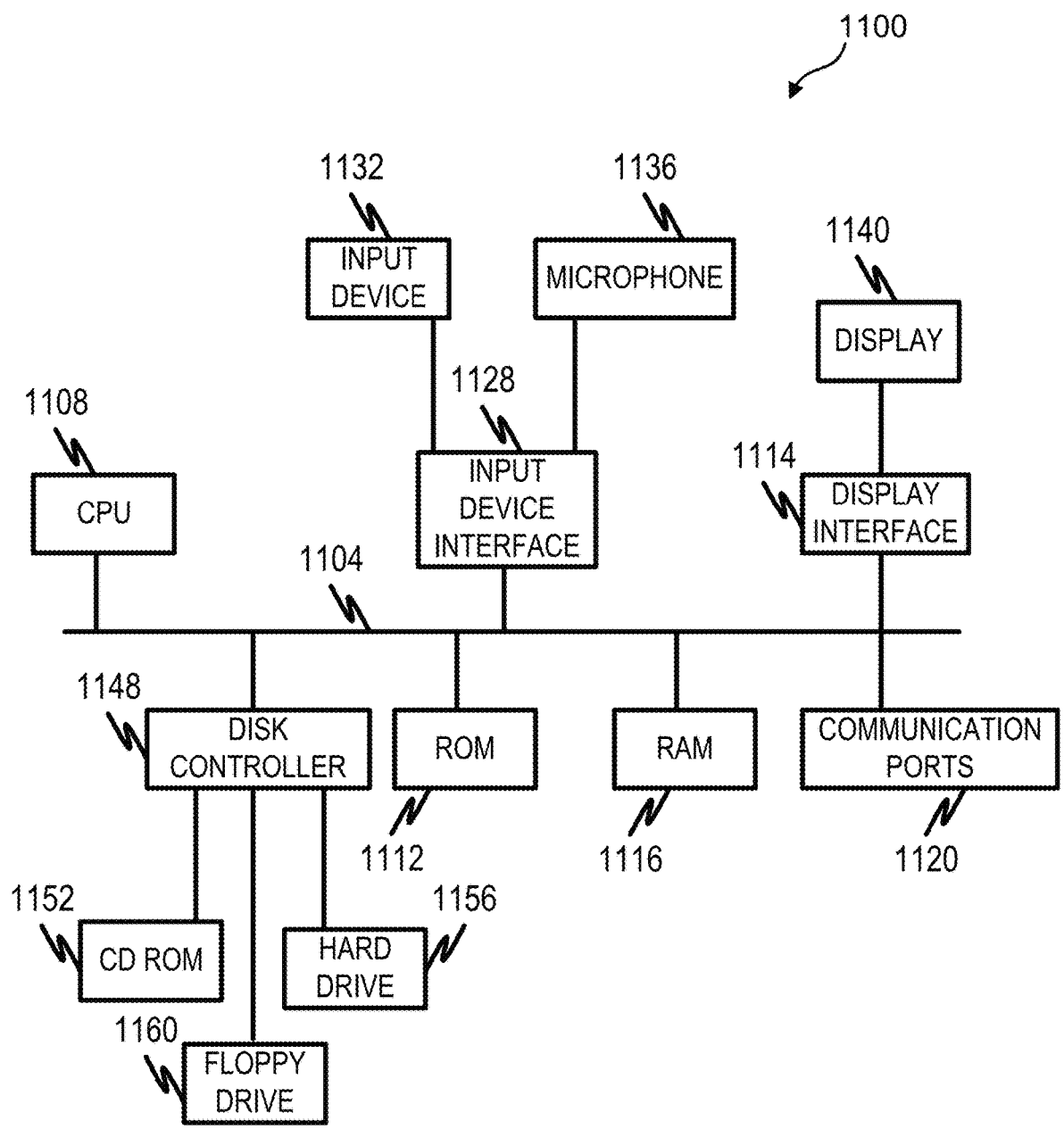
FIG. 11 is a diagram illustrating a sample computing device architecture for implementing various aspects described herein.

FIG. 11 is a diagram 1100 illustrating a sample computing device architecture for implementing various aspects described herein. A bus 1104 can serve as the information highway interconnecting the other illustrated components of the hardware. A processing system 1108 labeled CPU (central processing unit) (e.g., one or more computer processors/ data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface one or more optional disk drives to the system bus 1104. These disk drives can be external or internal floppy disk drives such as 1160, external or internal CD-ROM, CD-R, CD-RW or DVD, or solid state drives such as 1152, or external or internal hard drives 1156. As indicated previously, these various disk drives 1152, 1156, 1160 and disk controllers are optional devices. The system bus 1104 can also include at least one communication port 1120 to allow for communication with external devices either physically connected to the computing system or available externally through a wired or wireless network. In some cases, the communication port 1120 includes or otherwise comprises a network interface.

To provide for interaction with a user, the subject matter described herein can be implemented on a computing device having a display device 1140 (e.g., a CRT (cathode ray tube) or LCD (liquid crystal display) monitor) for displaying information obtained from the bus 1104 to the user and an input device 1132 such as keyboard and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone 1136, or tactile feedback); and input from the user can be received in any form, including acoustic, speech, or tactile input. In the input device 1132 and the microphone 1136 can be coupled to and convey information via the bus 1104 by way of an input device interface 1128. Other computing devices, such as dedicated servers, can omit one or more of the display 1140 and display interface 1114, the input device 1132, the microphone 1136, and input device interface 1128.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more data processors forming part of at least one computing device, the method comprising:
   receiving, by a handwritten flowchart recognition component, a digitally encoded image comprising a handwritten diagram having a plurality of objects;
   converting, by the handwritten flowchart recognition component, the handwritten diagram into a digital flowchart having a plurality of nodes, the digital flowchart being in a computer-readable editable format;
   determining, by an activity matching component, for pairs of nodes and plurality of executable bot activities, a confidence score based on at least one of (i) a textual similarity of contents of a node in the pair of nodes and an executable bot activity of the plurality of executable bot activities or (ii) a contextual similarity between a subset of executable bot activities from the plurality of bot activities which measures how often they co-appear in a plurality of reference bots;
   generating, by a flowchart to robotic process automation bot component, a robotic process automation bot script by mapping the plurality of nodes to an executable bot activity of the plurality of executable bot activities based on the confidence score; and
   providing the robotic process automation bot script to a robotic process automation system for further modeling.

2. The method of claim 1, further comprising:
   querying a data repository comprising the plurality of bots and the plurality of executable activities, wherein a query comprises handwritten labels for the plurality of nodes;
   pairing a node with one executable bot activity of the plurality of executable bot activities;
   generating the confidence score for pairs; and
   ranking at least one executable bot activity based on the confidence score that bot activity, wherein a highest ranking executable bot activity for the node is mapped to that node.

3. The method of claim 1, wherein the providing comprises displaying the robotic process automation bot script on a graphical user interface having a positive indicator representing the confidence score is above a predetermined threshold or a negative indicator representing the confidence score is below a predetermined threshold.

4. The method of claim 1, further comprising:
   receiving, by the activity matching component, feedback corrections from a user correcting mappings having the negative indicator; and
   optimizing the activity matching component using the feedback corrections to further improve the matching.

5. The method of claim 1, wherein the textual similarity is a score between 0 and 1 and is determined based on the contents of one node of the plurality of nodes compared with contents of one of the executable bot activities.

6. The method of claim 1, wherein the contextual similarity is determined by comparing at least two nodes of the plurality of nodes including a current node being analyzed, a predecessor node, or a successor node, wherein a co-appearance frequency of each combination of candidate bot activities is measured in a set of reference bots.

7. The method of claim 1, wherein the confidence is determined by a weighted combination of the textual similarity and the contextual similarity.

8. The method of claim 1, wherein the further modeling of the robotic process automation bot script comprises at least one of modifying the robotic process automation bot script using a bot design application, storing the robotic process automation bot script within a bot repository of the robotic process automation system, or executing the robotic process automation bot script using a bot execution engine of the robotic process automation system.

9. The method of claim 1, wherein the object detection component uses a convolutional neural network (CNN) architecture.

10. The method of claim 1, wherein at least one executable bot activity comprises at least one of (i) a name of an automation, (ii) a description of the automation, (iii) implementation code for the automation, (iv) an input parameter, and (v) an output field comprising a result of the automation.

11. The method of claim 1, wherein the converting comprises:
   localizing and classifying, by the object detection component, a plurality of objects within the handwritten diagram;
   identifying, by a structure recognition component, connections between symbols of the plurality of objects based on content of the respective object;
   interpreting, by a handwriting recognition component, one or more alphanumeric text strings within a portion of the plurality of objects; and
   automatically generating, without human intervention, the digital flowchart of the digitally encoded image, the digital flowchart having the identified connections among the plurality of objects, the digital flowchart being in a computer-readable editable format.

12. A system comprising:
   one or more data processors; and
   memory storing instructions stored on one or more data processors, which when executed perform operations comprising:

receiving, by a handwritten flowchart recognition component, a digitally encoded image comprising a handwritten diagram having a plurality of objects;

converting, by the handwritten flowchart recognition component, the handwritten diagram into a digital flowchart having a plurality of nodes, the digital flowchart being in a computer-readable editable format;

determining, by an activity matching component, a confidence score based on at least one of (i) a textual similarity of contents of the node and a plurality of executable bot activities or (ii) a contextual similarity between a set of activities which measures how often they coappear in a plurality of reference bots;

generating, by a flowchart to robotic process automation bot component, a robotic process automation bot script by mapping the plurality of nodes to an executable bot activity of the plurality of executable bot activities based on the confidence score; and providing the robotic process automation bot script to a robotic process automation system for further modeling.

13. The system of claim 12, wherein the operations further comprise:
querying a data repository comprising the plurality of bots and the plurality of executable activities, wherein a query comprises handwritten labels for the plurality of nodes;
pairing a node with one executable bot activity of the plurality of executable bot activities;
generating the confidence score for pairs; and
ranking at least one executable bot activity based on the confidence score that bot activity, wherein a highest ranking executable bot activity for the node is mapped to that node.

14. The system of claim 12, wherein the providing comprises displaying the robotic process automation bot script on a graphical user interface having a positive indicator representing the confidence score is above a predetermined threshold or a negative indicator representing the confidence score is below a predetermined threshold.

15. The system of claim 12, wherein the operations further comprise:
receiving, by the activity matching component, feedback corrections from a user correcting mappings having the negative indicator; and
optimizing the activity matching component using the feedback corrections to further improve the matching.

16. The system of claim 12, wherein the textual similarity is a score between 0 and 1 and is determined based on the contents of one node of the plurality of nodes compared with contents of one of the executable bot activities.

17. The system of claim 12, wherein the contextual similarity is determined by comparing at least two nodes of the plurality of nodes including a current node being analyzed, a predecessor and/or successor node, wherein a co-appearance frequency of each combination of candidate bot activities is measured in a set of reference bots.

18. The system of claim 12, wherein the confidence is determined by a weighted combination of the textual similarity and the contextual similarity.

19. The system of claim 12, wherein the further modeling of the robotic process automation bot script comprises at least one of storing the robotic process automation bot script within a bot repository of the robotic process automation system, modifying the robotic process automation bot script using a bot design application, or executing the robotic process automation bot script using a bot execution engine of the robotic process automation system.

20. A non-transitory computer program product storing instructions which, when executed by at least one data processor forming part of at least one computing device, implement operations comprising:
receiving, by a handwritten flowchart recognition component, a digitally encoded image comprising a handwritten diagram having a plurality of objects;
converting, by the handwritten flowchart recognition component, the handwritten diagram into a digital flowchart having a plurality of nodes, the digital flowchart being in a computer-readable editable format;
determining, by an activity matching component, a confidence score based on at least one of (i) a textual similarity of contents of the node and a plurality of executable bot activities or (ii) a contextual similarity between a set of activities which measures how often they coappear in a plurality of reference bots;
generating, by a flowchart to robotic process automation bot component, a robotic process automation bot script by mapping the plurality of nodes to an executable bot activity of the plurality of executable bot activities based on the confidence score; and
providing the robotic process automation bot script to a robotic process automation system for further modeling.

* * * * *